United States Patent
Kühne et al.

(10) Patent No.: US 10,382,160 B2
(45) Date of Patent: Aug. 13, 2019

(54) JAMMING DEVICE AND JAMMING METHOD

(71) Applicant: Rohde & Schwarz GmbH & Co. KG, München (DE)

(72) Inventors: Jens Kühne, Ebersberg (DE); Thomas Schmid, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 15/969,993

(22) Filed: May 3, 2018

(65) Prior Publication Data
US 2018/0351690 A1     Dec. 6, 2018

(30) Foreign Application Priority Data

Jun. 2, 2017 (EP) .................................... 17174125
Aug. 2, 2017 (EP) .................................... 17184499

(51) Int. Cl.
*H04K 3/00* (2006.01)
*H04B 1/715* (2011.01)

(52) U.S. Cl.
CPC ............. *H04K 3/45* (2013.01); *H04B 1/715* (2013.01); *H04K 3/42* (2013.01); *H04K 3/92* (2013.01)

(58) Field of Classification Search
USPC .......................................................... 455/1
See application file for complete search history.

(56) References Cited

U.S. PATENT DOCUMENTS 5,999,561 A * 12/1999 Naden .................... H04B 1/707
  375/142
7,606,524 B1 * 10/2009 Frank ....................... H04K 3/42
  455/1

(Continued)

OTHER PUBLICATIONS

Extended European search report for European Patent Application No. 17174125.9, dated Nov. 24, 2017, 7 pages.

(Continued)

*Primary Examiner* — Fayyaz Alam
(74) *Attorney, Agent, or Firm* — Westman, Champlin & Koehler, P.A.

(57) ABSTRACT

The present invention provides a jamming device for jamming a frequency hopping signal, the jamming device comprising at least one receiving antenna configured to receive signals in the signal spectrum of the frequency hopping signal, an emission detection unit configured to detect emissions in the received signals that possibly pertain to the frequency hopping signal, a signal analysis unit configured to analyze the detected emissions for determining characteristic properties of the frequency hopping signal in an analysis mode and configured to output corresponding jamming trigger signals in an active jamming mode if detected emissions pertain to the frequency hopping signal, and a signal jamming unit configured to jam in the active jamming mode the relevant emissions with a predictive jamming scheme based on the jamming trigger signals if the jamming trigger signals are available and based on a reactive jamming scheme or a barrage jamming scheme if the jamming trigger signals are not available. Further, the present invention provides a respective jamming method.

20 Claims, 5 Drawing Sheets

(56) References Cited

U.S. PATENT DOCUMENTS

| | | | | |
|---|---|---|---|---|
| 8,543,053 B1* | 9/2013 | Melamed | .................. | H04K 3/43 |
| | | | | 455/1 |
| 2003/0103589 A1* | 6/2003 | Nohara | .................. | H04B 1/713 |
| | | | | 375/350 |
| 2005/0041728 A1* | 2/2005 | Karlsson | .................. | H04K 3/42 |
| | | | | 375/219 |
| 2006/0140251 A1* | 6/2006 | Brown | .................. | H04B 1/7143 |
| | | | | 375/135 |
| 2006/0153281 A1* | 7/2006 | Karlsson | .................. | H03J 7/02 |
| | | | | 375/130 |
| 2009/0209196 A1* | 8/2009 | Haverty | .................. | H04K 3/28 |
| | | | | 455/1 |
| 2009/0214205 A1* | 8/2009 | Clark | ....................... | H04K 3/42 |
| | | | | 398/39 |
| 2009/0311963 A1* | 12/2009 | Haverty | ................. | H04K 3/226 |
| | | | | 455/63.1 |
| 2013/0315341 A1* | 11/2013 | Couillard | ................. | H04K 3/80 |
| | | | | 375/285 |
| 2016/0344510 A1* | 11/2016 | Shishkin | .................. | H04K 3/80 |

OTHER PUBLICATIONS

Extended European search report for European Patent Application No. 17184499.6, dated Feb. 2, 2018, 6 pages.

\* cited by examiner

JAMMING DEVICE AND JAMMING METHOD

CROSS-REFERENCE TO RELATED APPLICATIONS

The present application claims priority to European Patent Application No. 17174125.9, filed on Jun. 2, 2017, and European Patent Application No. 17184499.6, filed on Aug. 2, 2017, the contents of which are hereby incorporated by reference in their entirety.

TECHNICAL FIELD

The present invention relates to a jamming device for jamming a frequency hopping signal. The present invention further relates to a respective jamming method.

BACKGROUND

Although applicable in principal to any system that is used to jam wireless signals, the present invention and its underlying problem will be hereinafter described in combination with FHSS jammers.

In frequency-hopping spread spectrum or FHSS system, radio signals are transmitted by rapidly switching a carrier among many frequency channels. The switching of the frequency channels is usually based in a pseudorandom sequence known to both transmitter and receiver. FHSS systems therefore spread their signal over rapidly changing frequencies. An available frequency band may e.g. be divided into sub-frequencies. The emitted signals may then rapidly change or hop among these sub-frequencies in a pre-determined order.

FHSS signals are e.g. used in first generation WLAN systems, in Bluetooth systems and especially in the free 2.4 GHZ frequency spectrum e.g. by radio control devices for model vehicles, like e.g. aircraft and drones.

Especially the application of FHSS modulation to remote controlled drones and aircraft may pose a problem in situations or areas that do not allow flying such aircraft or drones. It may for example be prohibited to fly model aircraft or drones near an airport for safety reasons. With other modulation methods, the emitter or controller signals may easily be jammed, since the relevant frequencies are known. However, with FHSS modulating transmitters, it is difficult to track the relevant emissions.

To jam such FHSS signals e.g. of model drones, the full frequency spectrum may therefore be jammed. This however also blocks the frequency spectrum for any other use. If only the relevant sections of the frequency band may be jammed, a so called predictive following jammer may be used that anticipates and follows the frequency hops and only jams the relevant frequencies. However, with predictive following jammers it is necessary to know the exact frequency sequence and timing of the frequency hops.

SUMMARY

Against this background, there is the need to provide an improved control method for wireless jammers.

Accordingly it is provided:

According to a first aspect, a jamming device for jamming a frequency hopping signal is provided, the jamming device comprising: at least one receiving antenna configured to receive signals in the signal spectrum of the frequency hopping signal, an emission detection unit configured to detect emissions in the received signals that possibly pertain to the frequency hopping signal, a signal analysis unit configured to analyze the detected emissions for determining characteristic properties of the frequency hopping signal in an analysis mode and output corresponding jamming trigger signals in an active jamming mode if detected emissions pertain to the frequency hopping signal, and a signal jamming unit configured to jam in the active jamming mode the relevant emissions with a predictive jamming scheme based on the jamming trigger signals if the jamming trigger signals are available and based on a reactive jamming scheme or a barrage jamming scheme if the jamming trigger signals are not available.

According to a second aspect, a jamming method for jamming a frequency hopping signal is provided, the jamming method comprising: receiving signals in the signal spectrum of the frequency hopping signal, detecting emissions in the received signals that possibly pertain to the frequency hopping signal, analyzing the detected emissions for determining characteristic properties of the frequency hopping signal in an analysis mode, outputting corresponding jamming trigger signals in an active jamming mode if detected emissions pertain to the frequency hopping signal, and jamming in the active jamming mode the relevant emissions with a predictive jamming scheme based on the jamming trigger signals if the jamming trigger signals are available and based on a reactive jamming scheme or a barrage jamming scheme if the jamming trigger signals are not available.

The present invention is based on the finding that it is not always necessary to know the exact frequency sequence and the hop timing to successfully jam a FHSS signal.

Instead it may be sufficient to known the hop timing or timing sequence of a FHSS signal to successfully jam the FHSS signal. The present invention is based on the finding that the effort for detecting the relevant frequencies is greatly reduced if the hop timing is known. This allows analyzing the received signal only for specific moments in time according to the known hop timing.

The timing sequence may simply comprise a fixed emission period or emission frequency (referring to the timing), like e.g. the information that an emission of the FHSS signal is emitted every 1 mS or with a frequency of 1 KHz. It is understood, that the number of 1 mS is just exemplarily chosen and any other number is possible. The timing sequence may however also describe a sequence with varying periods between the single emissions of the FHSS signal. Such a timing sequence may e.g. comprise the information that a first emission is 1 mS long, the next emission starts after 100 µS and is 1.5 mS long, the next emission stars after 120 µS and is 1 mS long and so on. It is understood that such a timing sequence may comprise as many entries as a complete cycle of the FHSS comprises emissions. It is understood that the timing sequence may also comprise two or more time step sequences that may be interleaved.

The present invention provides at least one receiving antenna. The receiving antenna may be any type of antenna that is adapted to receive signals in the relevant frequency band of the FHSS signal. Such a receiving antenna may e.g. be a di-pole antenna, a strip or micro-strip antenna or an antenna array. The receiving antenna may be coupled e.g. via a cable to a receiver that may e.g. provide the received signal as IQ signal to the emission detection unit. The IQ signal comprises the In-phase and Quadrature components of the received signal. The receiver may e.g. comprise a digital data interface and provide these signals to the emission detection unit via the digital data interface. It is understood, that the emission detection unit may comprise the same type of digital data interface for receiving the IQ signal data. It is understood, that an analogue interface would also be possible.

The emission detection unit may then detect emissions in the received signal that may possibly pertain to the FHSS signal. The emission detection unit may e.g. simply analyze the frequency spectrum for energy peaks. Such energy peaks may indicate an active emission that could be part of the FHSS signal. This information provided by the emission detection unit may then be used by the signal analysis unit.

The signal analysis unit then analyzes in an analysis mode the detected emissions to determine characteristic properties of the frequency hopping signal.

Usually, the different possible types of frequency hopping signals are known. Such signals may e.g. be Bluetooth signals, WLAN signals or signals for remote controlled devices like drones or the like. Every emitter of a frequency hopping signal may—within the limits of the respective standard vary the frequency hopping signal, e.g. a hop rate and/or a frequency or channel sequence, in general the characteristic properties of the frequency hopping signal.

To be able to jam the respective frequency hopping signal in an active jamming mode, the signal analysis unit will therefore try to determine the characteristic properties in an analysis mode. After determining the characteristic properties, the signal analysis unit may switch into the active jamming mode. In the active jamming mode the signal analysis unit may provide trigger signals to the jamming unit that correspond to single emissions or bursts of the frequency hopping or FHSS signal. The trigger signals then trigger the jamming unit to emit a jamming signal in a predictive jamming scheme. The jamming scheme may be called predictive, because the characteristic properties of the FHSS signal are known in the signal analysis unit and e.g. channel hops may be predicted and the respective emission or burst may be directly jammed.

Further, the present invention provides the signal jamming unit with the ability to automatically switch between different jamming modes depending on the available information. If the above mentioned characteristic properties are determined by the signal analysis unit, the signal jamming unit performs the predictive jamming. If this information is not available, the signal jamming unit may try to perform a reactive jamming or a barrage jamming. The reactive jamming comprises the signal jamming unit trying to identify an emission of the FHSS signal as soon as it starts and jamming the emission as soon as it is identified. This is then repeated for all following emissions. To this end the signal jamming unit may e.g. cooperate with the signal analysis unit and offload the identification of the emissions of the FHSS signal to the signal analysis unit. The barrage jamming comprises the signal jamming unit emitting a wide-band jamming signal that jams a section or the complete frequency band that may be used by the FHSS signal.

The reactive jamming scheme may not be as effective as the predictive jamming scheme but may still serve to jam the FHSS signal enough to e.g. prohibit a drone pilot to control his vessel. At the same time, the influence on other wireless signals will be minimized. The barrage jamming scheme in contrast will jam all wireless signals in a specific area and in the configured frequency band.

Summing up, with the present invention allows jamming a FHSS signal with reduced effort. This becomes possible by analyzing the FHSS signal in advance and then identifying and jamming the FHSS signal emissions based on the characteristic properties in an active jamming mode.

Further embodiments of the present invention are subject of the further subclaims and of the following description, referring to the drawings.

In a possible embodiment, the emission detection unit may comprise a frequency analysis unit that may be configured to convert the received signal into the frequency domain and perform a time-based averaging of the received signal in the frequency domain. The time frame for the time based averaging may be predetermined e.g. because the length of the single bursts of the FHSS signal is known. Especially in the analysis mode a time frame may be chosen that is known to be short enough to allow detection of the FHSS signal emissions. If for example the FHSS signal uses emissions of 1 mS length, the time frame may be 100 μS. Alternatively the time frame for the time based averaging may be provided by the signal analysis unit after this unit identifies the characteristic properties of the FHSS signal.

It is understood, that the frequency analysis unit may e.g. comprise a buffer for storing the values or samples of the received signal, e.g. the spectral data, that are combined to calculate the average. It is further understood, that the frequency analysis unit may comprise more than one such buffer. The number of buffers may e.g. be as high as the number of samples that are combined for one average value. The buffers may then be used to calculate the average for that number of samples but starting with different samples. The buffers after one cycle will therefore comprise the data of partially overlapping samples. The same may also be achieved by calculating a running average with a single buffer.

The resolution that the frequency analysis unit uses in the frequency domain, e.g. the number of frequency bins, may be predetermined or may be provided by the signal analysis unit after identifying the characteristic properties of the FHSS signal. The resolution in the frequency domain may especially represent the channel width of the FHSS signal.

It is further understood, that the bandwidth that the frequency analysis unit uses for transforming the received signal into the frequency domain may represent the relevant frequency bandwidth or frequency range of the FHSS signal.

The emission detection unit, especially the frequency analysis unit of the emission detection unit, may e.g. perform the detection in the digital domain, especially if the received signal is provided as IQ signal data. If the received signal is provided as analog signal, the emission detection unit may comprise an analog to digital converter or process the received signal in the analog domain. The signal processing may e.g. comprise performing a Fourier Transform, especially a Fast-Fourier-Transform. An alternative (exclusive or parallel) to a Fast-Fourier-Transform may be a polyphase filter bank.

The emission detection unit may further comprise a detector configured to qualify emissions in the received signals as possibly pertaining to the frequency hopping signal if respective peaks in the averaged received signal in the frequency domain are higher than a predetermined threshold value. Possibly pertaining to the frequency hopping signal in the context of the detector refers to every signal peak that is detected and is higher than the general noise level. The detector may e.g. comprise a comparator that compares the averaged values for the single frequency bins with the predetermined threshold value. In other words, the comparator verifies if the energy transported in the received signal for specific frequencies or frequency bins is larger than the predetermined threshold value.

In a possible embodiment, the emission detection unit may further comprise a threshold calculation unit configured to calculate the predetermined threshold value based on the received signal in the frequency domain, especially the averaged received signal in the frequency domain. The threshold calculation unit may be e.g. be configured to calculate the predetermined threshold value as the median value or the averaged value of the energy level of all frequency bins of the averaged received signal in the frequency domain. The threshold calculation unit determines the predetermined threshold value such that the predetermined threshold value separates the background noise or noise flor from actual emissions.

In a possible embodiment, the emission detection unit may be configured to provide the signal analysis unit with frequency information about detected emissions. The emission detection unit, especially the detector, may e.g. provide the signal analysis unit with the center frequency of the frequency bins in which emissions have been detected, this may especially be the case in the analysis mode.

The signal analysis unit may comprise a channel extraction unit, like e.g. a digital down converter, configured to extract from the received signals the signals in the frequency ranges of the detected emissions for analyzing the single detected emissions. Extracting the single detected emissions may refer to separating the received signals in the time/frequency domain from the noise signal parts and the surrounding signal parts based on the determined frequency ranges of the detected emissions. It is understood, that the signal analysis unit may e.g. comprise a buffer that stores the received signals for the channel extraction unit while the emission detection unit performs its analysis.

The channel extraction unit may e.g. receive the IQ signal data and separate the full bandwidth IQ signal data into the parts of the IQ signal data in single frequency ranges or channels. If for example the bandwidth of the IQ signal data is 80 MHZ, the channel extraction unit may select and extract 1 MHz wide channels from the IQ signal. The DDC may especially select and extract only those channels that are indicated to the DDC by the emission detection unit, especially the detector. It is understood, that the above channel width of 1 MHz is just exemplarily chosen and that any other channel bandwidth is possible. The same applies to the overall IQ signal data bandwidth.

After extracting the single detected emissions, these may be processed separately, e.g. by a signal type determination unit.

In a possible embodiment, the signal analysis unit may comprise a signal type determination unit configured to analyze if a detected emission corresponds to a predetermined emitter and analyze the timing sequence and/or the frequency sequence of the detected emissions that correspond to the predetermined emitter.

For a specific emitter certain details may be known. It may e.g. be known what modulation scheme is used by the emitter for the FHSS signal. Further, timing information may be available for the FHSS signal.

The signal type determination unit may therefore e.g. determine the modulation scheme of the detected emissions. This on the one hand allows discarding all detected emissions that comprise another modulation scheme than the FHSS signal. On the other hand it is now possible to demodulate the detected emissions and further analyze the content of the detected emissions. Determining the modulation scheme of the detected emissions may e.g. be performed by analyzing how the signal parts of the detected emissions are spread in the respective frequency spectrum of the wireless channel and how the signal parts change, e.g. in amplitude and phase.

The signal type determination unit may further determine timing characteristics of the detected emissions. The signal type determination unit may e.g. determine the start times and the lengths of the single bursts or detected emissions.

This information may then be compared to the known parameters of the FHSS signal to determine if a detected emission may pertain to the FHSS signal. If the single emissions or bursts are demodulated further analysis of the content may be performed by the signal type determination unit. The signal type determination unit may e.g. analyze a preamble or other characteristic sections of the bursts or emissions for the occurrence of known or expected content.

It is understood, that the signal type determination unit may perform this analysis without discarding any bursts or emissions. Instead the signal type determination unit may group bursts or emissions according to the analysis results. This may e.g. lead to a single group of bursts or emissions for every emitter that is in range of the jamming device. It is understood, that the specific group may be selected for further processing that pertains to the FHSS signal.

The group may e.g. comprise the single bursts or emissions in chronological order. In a computer memory this information may be represented by an array of objects. Every object may represent one burst or emission. Such an object may comprise the raw IQ data or the demodulated data. It is understood, that such an object may also comprise additional information, like e.g. the above mentioned information about the start times and the lengths of the single bursts or detected emissions and the center frequencies of the single bursts or detected emissions.

The signal type determination unit may then e.g. analyze the timing sequence of the detected emissions by iterating through the bursts or emissions selected for the emitter of the FHSS signal as described above. The timing sequence may e.g. be determined by comparing the start times and the lengths of the single bursts or detected emissions. The same applies to the frequency sequence of the detected emissions that may e.g. be determined by noting the center frequencies of the detected emissions in sequential order.

In a possible embodiment, the signal type determination unit may comprise a triggering unit configured to generate, especially in the active jamming mode, the trigger signal based on the timing sequence and/or the frequency sequence of the detected emissions that correspond to the predetermined emitter. The trigger signal is the signal that triggers the signal jamming unit to emit a jamming signal. The triggering unit may e.g. use the determined timing sequence for the FHSS signal to trigger the signal jamming unit accordingly. The timing sequence may list e.g. start times and lengths of the single emissions or bursts of the FHSS signal. The triggering unit may comprise a clock that allows the triggering unit to count the time. The triggering unit may then set the triggering signal e.g. for the duration of a burst or emission and reset or cancel the triggering signal after the duration of the respective burst of emission.

The triggering unit may further generate a channel extraction trigger signal for the channel extraction unit based on the timing sequence and/or the frequency sequence of the detected emissions that correspond to the predetermined emitter. After identifying the characteristic properties of the FHSS signal, it is now possible to trigger the channel extraction unit accordingly. This e.g. allows reducing the operating frequency of the channel extraction unit and extracting only the relevant phases of the received signals in the time domain.

In an embodiment, the signal type determination unit may be configured to provide in the active jamming mode frequency information about the emissions that correspond to the predetermined emitter to the signal jamming unit. The signal jamming unit may be configured to emit a signal based on the respective frequency information and the trigger signal.

The signal type determination unit as explained above has all information about the FHSS signal that is required for jamming the FHSS signal. This information or characteristic properties may also comprise information about the frequency band or frequency range, i.e. the channel, that a burst or emission uses. This information when provided to the signal jamming unit allows the signal jamming unit to tune signal generators accordingly. The signal jamming unit may e.g. comprise exciters that generate the jamming signal with the required frequency. Such exciters may e.g. comprise voltage controlled oscillators or other signal generators. It is further understood, that the signal jamming unit may comprise more than one exciter. Different exciters may then be tuned to different frequencies. This may e.g. be performed such that the exciters are tuned sequentially to the frequencies of the next bursts. The last used exciter may then be tuned after emitting the respective signal to the frequency of the next burst that is not yet represented in one of the exciters. If for example 5 exciters are present, the exciters may be tuned to the frequencies of bursts 1 to 5. After jamming the first burst, the first exciter may be tuned to the frequency of the sixth burst and so on.

The number of exciters may be equal to or larger than the number of channels used by the FHSS signal. In this case all required frequencies may be permanently set in the exciters. The trigger signal may in this case comprise an individual trigger signal that triggers only the respective one of the exciters.

Although not explicitly mentioned, it is understood that the signal jamming unit may comprise a signal emitter for emitting the jamming signal. The emitter may e.g. emit a jamming signal for every detected burst in the received signal. As mentioned above, the emitter may tune the jamming signal according to the frequency information. The jamming signal may e.g. be a simple sinusoidal signal in the required frequency range. Alternatively, the jamming signal may also be a modulated signal that is modulated according to the modulation used by the FHSS signal. If a modulated signal is provided in the frequency range of a respective burst, the receiver may be disturbed and may e.g. loose synchronization with the incoming signal. In this case it is not necessary to mimic the exact modulation of the respective burst, but a similar modulation will be beneficial. It is however, also possible to explicitly modify the information content of the FHSS signal by e.g. overwriting parts of the FHSS signal bursts. In this case the exact modulation of the respective burst needs to be recreated. If for example a burst comprises a low signal level section, this section may be overwritten by the jamming signal with a high signal level.

In an embodiment, the triggering unit may be configured to generate an averaging trigger for the frequency analysis unit based on the timing sequence and/or the frequency sequence of the detected emissions that correspond to the predetermined emitter. The averaging trigger may trigger an averaging cycle in the frequency analysis unit. This means that the frequency analysis unit may e.g. average the values of the frequency bins in the frequency domain for the duration between two averaging triggers. If the characteristic properties of the FHSS signal are known, this may e.g. be advantageously used to perform a long averaging cycle prior to a burst or emission that is known to happen. This long averaging cycle may be used by the threshold calculation unit to calculate a noise level. Shortly before the known occurrence of a burst or emission of the FHSS signal, the next averaging trigger may be provided to perform an averaging over the burst or emission of the FHSS signal.

In a possible embodiment, the signal analysis unit may comprise a synchronization unit configured to receive from the signal type determination unit signal synchronization information and to output a synchronization trigger signal if an emission of the frequency hopping signal is detected based on the signal synchronization information.

The signal synchronization information may e.g. comprise the known timing sequence and/or the frequency sequence that may allow the synchronization unit to determine a starting point for the jamming operation. Such a starting point may e.g. be the beginning of a frequency or channel hop cycle, i.e. the first burst or emission of such a cycle.

The signal synchronization information may however also comprise information that identifies a single burst or emission of the FHSS signal. The position of the single burst or emission in the timing sequence and the frequency or channel hop sequence is known from the analysis mode. Therefore, if such a specific burst or emission is detected the jamming device may synchronize onto the FHSS signal based on the knowledge of the timing sequence and/or the frequency sequence. The synchronization trigger signal may indicate the start of an active jamming mode or operation for the jamming device. It is understood, that the synchronization unit may be provided with signal synchronization information for different bursts or emissions consecutively during or before entering the active jamming mode. The triggering unit may use the synchronization trigger signal for generating the averaging trigger and the trigger signal with the required timing.

In an embodiment, the signal type determination unit may be configured to provide in the signal synchronization information a predetermined modulation scheme and a predetermined template signal.

The synchronization unit may e.g. use the information about the modulation scheme to demodulate the single bursts or emissions. This will allow the synchronization unit to analyze the content of the single bursts or emissions. The predetermined template signal may then be used by the synchronization unit to determine if the content of the demodulated burst is similar to or equal to the predetermined template signal. If this is the case, the burst or emission may be identified as the individual burst or emission that should be identified to generate the synchronization trigger signal.

In an embodiment, the synchronization unit may comprise a demodulator coupled on an input side to the channel extraction unit and coupled on an output side to the input side of a correlator. The correlator may be coupled on the output side to an input side of a threshold detector.

As explained above, the demodulator may be used to demodulate the extracted signals according to the predetermined modulation scheme.

The correlator may then correlate the demodulated signal with the predetermined template signal and output the correlation result. The predetermined template signal may e.g. comprise a preamble that is present in the respective burst or emission of the FHSS signal. The result of the correlation will comprise a high value if the demodulated signal is similar or equal to the predetermined template signal. The result of the correlation may e.g. be normalized and comprise a value between 0 and 1 or 0% and 100%. It is understood, that this values are just exemplarily presented and that any other, especially non-normalized, values may be provided in the correlation result.

The threshold detector may then output the synchronization trigger signal if the value or level of the correlation result is higher than a predetermined threshold value. If the correlation result comprises a value between 0 and 1, the threshold value may e.g. be between 0.5 and 1, e.g. 0.6; 0.7; 0.8; 0.9; or 1. It is understood, that any value between 0.5 and 1 is possible.

In a possible embodiment, the signal analysis unit may comprise a jamming control unit configured to synchronize to the frequency hopping signal based on the synchronization trigger signal and configured to control the emission detection unit and/or the signal analysis unit and/or the signal jamming unit synchronous to the frequency hopping signal. The jamming control unit and the triggering unit may e.g. be a single unit. Alternatively, the jamming control unit may comprise the triggering unit or vice versa.

The jamming control unit may be seen as a kind of central controller of the jamming device. The jamming control unit will timely synchronize the operation of all elements of the jamming device as soon as the synchronization trigger signal is provided. Prior to receiving the synchronization trigger signal, the jamming control unit may still perform an overall management of the jamming device. The jamming control unit may e.g. switch the operating mode of the jamming device from the analysis mode to the active jamming mode or vice versa as required. In the analysis mode the jamming control unit may e.g. provide the averaging trigger as explained above in short intervals that are short enough such that a single burst of the FHSS signal will be sequentially averaged multiple times.

The jamming control unit may e.g. control the jamming device to return from the active jamming mode to the analysis mode cyclically or sporadically and re-evaluate the received signals. The jamming control unit may also selectively turn off the jamming signal unit e.g. at the beginning or the end of a burst or emission of the FHSS signal to perform a verification of the results of the analysis phase. It would e.g. be sufficient to allow the preamble of such a burst to be emitted without jamming. This would allow re-analyzing the preamble.

It is understood, that the above units or elements and the functions they perform may be performed in the digital domain. This comprises the single units or elements being embodied as hardware, software of a combination of both. The jamming device or at least some units or elements may e.g. be embodied on an FPGA as respective configuration of the FPGA. The configuration may e.g. be stored in a non-volatile memory. On startup of the FPGA the configuration may be loaded from the non-volatile memory into a volatile memory of the FPGA that serves as configuration of the logic that is to be performed in the FPGA.

It is understood, that the FPGA may e.g. comprise analog interfaces and/or analog to digital converters that may interface with the receiving antenna. It is further understood, that e.g. analog filters, analog amplifiers or attenuators or the like may be provided between the antenna and the FPGA as required to provide the received signal to the FPGA. Further, a receiver may be interposed between the antenna and the FPGA and may convert the received analog signal into an IQ signal that may then be provided to the FPGA. It is further understood, that the above also applies to a jamming device that comprises a CPU, like e.g. a general purpose processor, a digital signal processor or a microcontroller.

This means that instead of a FPGA it is possible to use a processor to implement at least some functions of the jamming device in the digital domain. Instead of loading a configuration from the non-volatile memory, the processor may however load instructions from the non-volatile memory and execute the instructions.

It is further possible to combine a FPGA and a processor in the jamming device.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Figure 1:
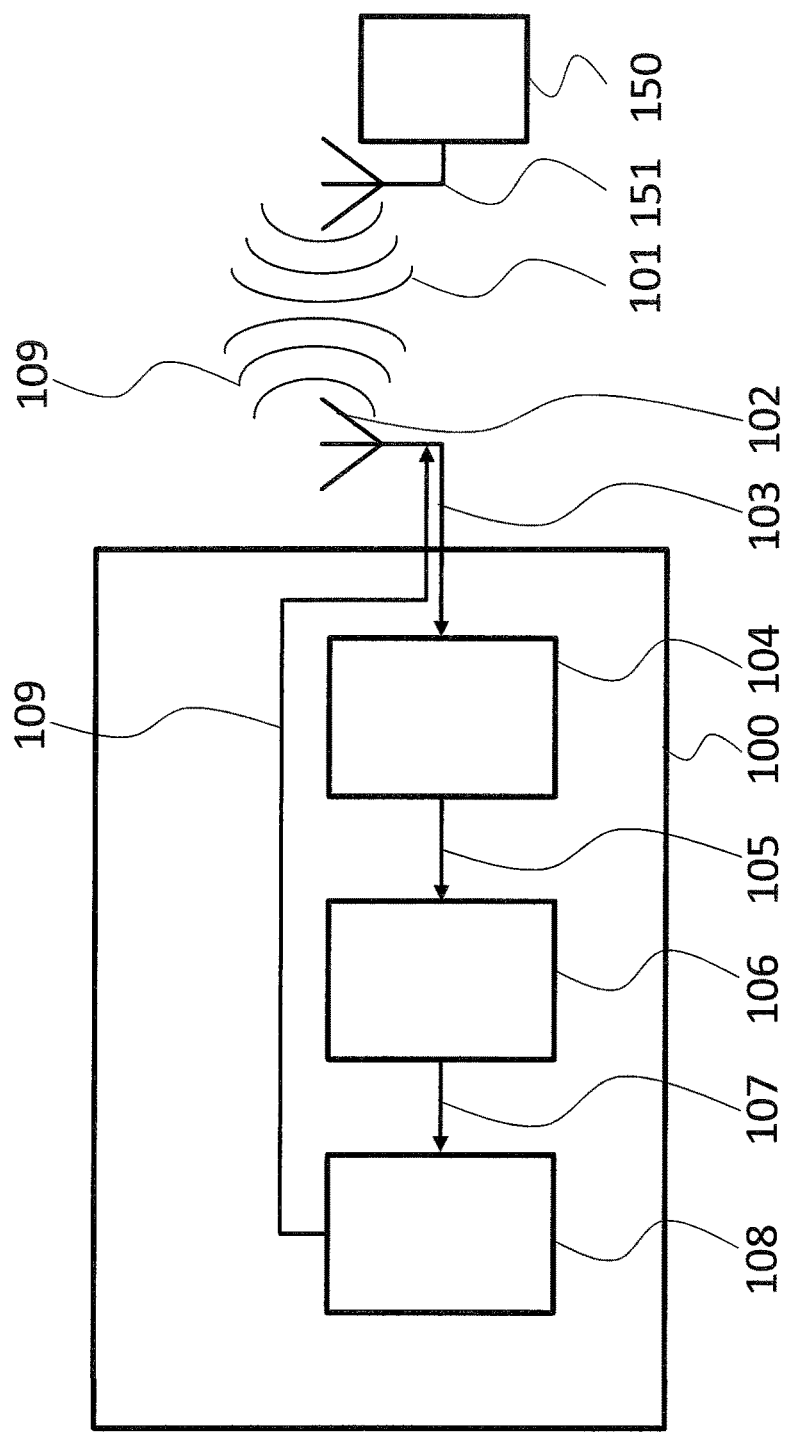
FIG. 1 shows a block diagram of an embodiment of a jamming device according to the present invention.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DETAILED DESCRIPTION OF THE DRAWINGS

FIG. 1 shows a block diagram of an embodiment of a jamming device 100 for jamming the frequency hopping signal 101 that emitter 150 emits via antenna 151. The emitter 150 may e.g. be a remote control for e.g. a drone.

The jamming device 100 comprises a receiving antenna 102 that is electrically coupled to an emission detection unit 104. The emission detection unit 104 is coupled to a signal analysis unit 106 that is coupled to a signal jamming unit 108.

The receiving antenna 102 receives signals 103 and provides the received signals 103 to the emission detection unit 104. The emission detection unit 104 detects emissions 105 in the received signals 103 that possibly pertain to the frequency hopping signal 101. The emissions 105 may e.g. be emissions of high energy in the relevant frequency spectrum. "High energy" relates to the energy of the emissions being detectable over the background noise.

The emission detection unit 104 provides the detected emissions 105 or at least information about the detected emissions 105 to the signal analysis unit 106. The signal analysis unit 106 may be operated in two different operating modes, an analysis mode and an active jamming mode.

In the analysis mode the signal analysis unit 106 may analyze the detected emissions 105 for determining characteristic properties of the frequency hopping signal 101. Such characteristic properties may e.g. refer to a timing of the channel hops of the frequency hopping signal 101 or the channel sequence of the frequency hopping signal 101.

In the active jamming mode, the signal analysis unit 106 outputs corresponding jamming trigger signals 107 if detected emissions 105 pertain to the frequency hopping signal 101. The matching of the detected emissions 105 to the emitter 150 may be performed based on the characteristic properties in the active jamming mode. If the characteristic properties of the frequency hopping signal 101 are determined, jamming is possible without analyzing every single burst. Instead the known sequence may be jammed with the known timing.

The jamming trigger signals 107 are provided to the signal jamming unit 108. The signal jamming unit 108 in reaction to the jamming trigger signals 107 jams the relevant emissions 105, 205, 305, i.e. with a predictive jamming scheme. The predictive jamming signal may only be used, if the jamming trigger signals 107 are available. Therefore, if no jamming trigger signals 107 are available, the signal jamming unit 108 may use a reactive jamming scheme or a barrage jamming scheme. The jamming signal 109 that is emitted by the signal jamming unit 108 may e.g. be a continuous wave signal. It is however possible that the signal jamming unit 108 may emit any other adequate signal form that is capable of jamming the frequency hopping signal 101.

In the jamming device 100 the signal jamming unit 108 is coupled to the receiving antenna 102 to emit the jamming signal 109. It is however understood, that the signal jamming unit 108 may also comprise a dedicated jamming antenna. It is further understood, that the signal jamming unit 108 may comprise or be coupled to an emitting circuitry. Such circuitry may e.g. comprise amplifiers and filters and any other required electric or electronic element.

Figure 2:
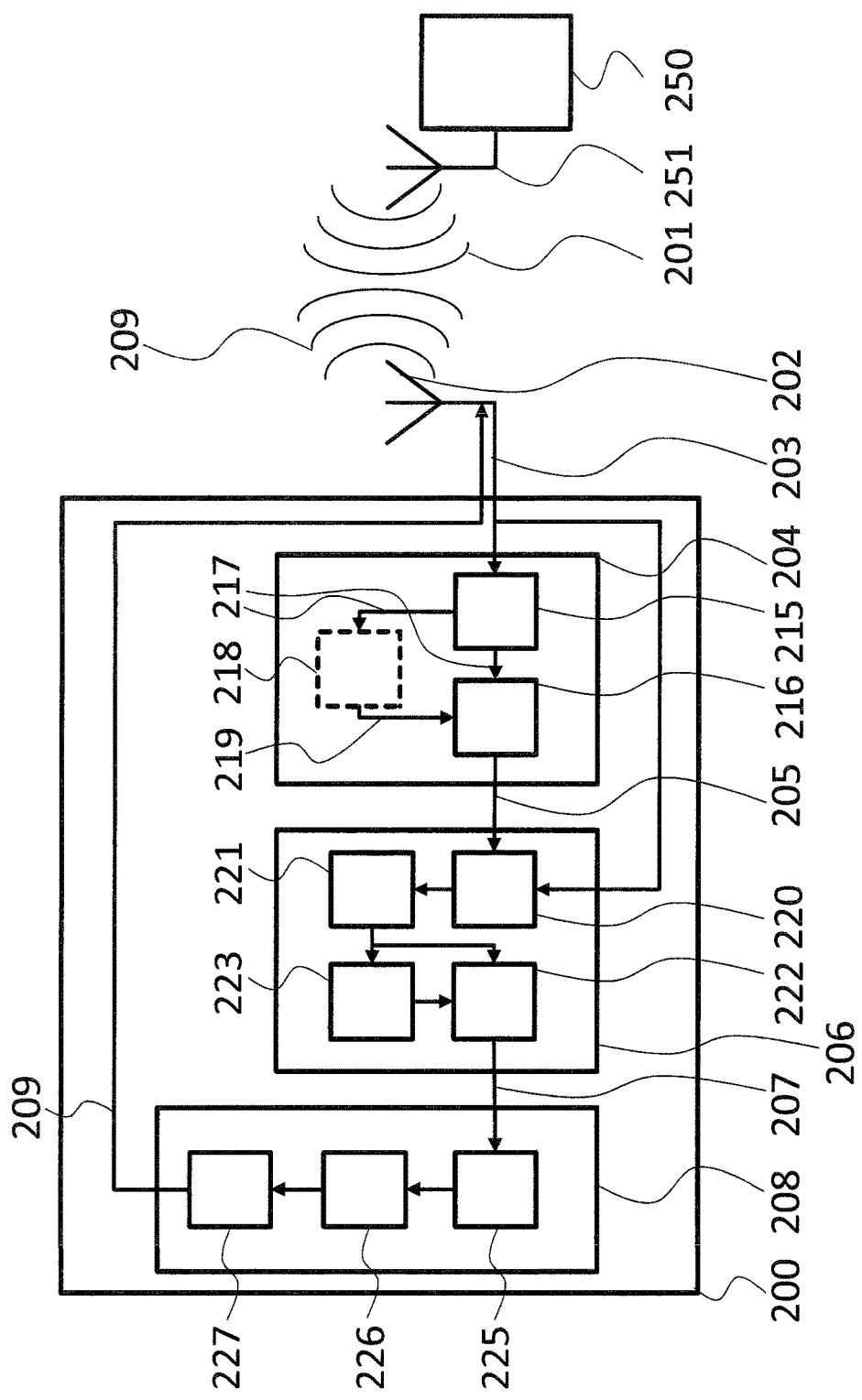
FIG. 2 shows a block diagram of another embodiment of a jamming device according to the present invention.

FIG. 2 shows a block diagram of another embodiment of a jamming device 200. The jamming device 200 is based on the jamming device 100 and therefore also comprises the receiving antenna 202 that is coupled to the emission detection unit 204. The emission detection unit 204 is coupled to the signal analysis unit 206 that is coupled to the signal jamming unit 208.

The emission detection unit 204 comprises a frequency analysis unit 215 that is coupled to a detector 216. The emission detection unit 204 converts the received signals 203 into the frequency domain. In the frequency domain the frequency analysis unit 215 performs a time-based averaging of the received signals 203 and provides the averaged received signals 217 to the detector 216. The time interval for averaging the received signal 203 may be predetermined or may be provided based on an analysis of the received signals 203, as will be explained below. In addition, a sliding or moving average may be calculated. Sliding or moving averages may also be calculated for a plurality of different window lengths or sample numbers concurrently.

The detector 216 then qualifies emissions 205 in the received signals 203 as possibly pertaining to the frequency hopping signal 201 if respective energy peaks in the averaged received signals 217 in the frequency domain are higher than a predetermined threshold value 219. The threshold value 219 may be a configuration option in the jamming device 200 that may be preset or user configurable. As an option the emission detection unit 204 may comprise a threshold calculation unit 218 that may calculate the predetermined threshold value 219 based on the averaged received signals 217 in the frequency domain. The threshold calculation unit 218 may e.g. calculate the predetermined threshold value 219 as the median value or the averaged value of the energy level of all frequency bins of the averaged received signals 217 in the frequency domain.

The emission detection unit 204 may provide the signal analysis unit 206 with frequency information about detected emissions 205. The frequency information may be provided as the detected emissions 205 because the frequency information identifies detected emissions 205. The frequency information may e.g. comprise the center frequency and or the bandwidth of the detected emissions 205.

The signal analysis unit 206 processes the received signals 203 based on the detected emissions 205, e.g. the frequency information. The signal analysis unit 206 comprises a channel extraction unit 220 that is coupled to a signal type determination unit 221. The signal type determination unit 221 is coupled to a triggering unit 222 and to a synchronization unit 223. The synchronization unit 223 is also coupled to the triggering unit 222.

The channel extraction unit 220 may e.g. be a digital down converter. The channel extraction unit 220 extracts from the received signals 203 the signals in the frequency ranges of the detected emissions 205 for analyzing the single detected emissions 205. The single or extracted detected emissions 205 are provided to the signal type determination unit 221 that analyzes if a detected emission corresponds to a predetermined emitter and further analyzes the timing sequence and/or the frequency sequence of the detected emissions 205 that correspond to the predetermined emitter.

The triggering unit 222 generates the jamming trigger signals 207 using the timing sequence and/or the frequency sequence of the detected emissions 205 that correspond to the predetermined emitter, i.e. the frequency hopping signal 201. The triggering unit 222 may further generate additional trigger signals based on the timing sequence and/or the frequency sequence of the detected emissions 205, like e.g. a channel extraction trigger signal (not explicitly shown) for the channel extraction unit 220. The triggering unit 222 may further generate an averaging trigger for the frequency analysis unit 215 based on the timing sequence and/or the frequency sequence of the detected emissions 205 that correspond to the predetermined emitter for triggering an averaging cycle in the frequency analysis unit 215.

The signal type determination unit 221 may provide in the active jamming mode frequency information (not explicitly shown) about the detected emissions 205 that correspond to the frequency hopping signal 201 to the signal jamming unit 208. The signal jamming unit 208 may then emit the jamming signal 209 based on the respective frequency information and the jamming trigger signals 207.

The synchronization unit 223 may receive from the signal type determination unit 221 signal synchronization information and output a synchronization trigger signal if an emission of the frequency hopping signal 201 is detected based on the signal synchronization information. Such synchronization information may e.g. comprise a predetermined modulation scheme and a predetermined template signal like a preamble, that allow the synchronization unit 223 to identify a single burst or emission of the frequency hopping signal 201.

The signal jamming unit 208 comprises an exciter 225. Although only one exciter 225 is shown it is understood that multiple exciters may be provided. Alternatively, the exciter 225 may be a multi-channel exciter with multiple output channels. The exciter 225 may e.g. generate a signal of a predetermined frequency. The frequency of this signal is configured based on the frequency information provided by the signal type determination unit 221. The emission of the jamming signal 209 is triggered by the jamming trigger signals 207. To generate the jamming signal 209 the output of the exciter 225 is provided to a modulator 226 that modulates the output of the exciter 225. The modulated output is then provided to an amplifier 227 that amplifies the jamming signal 209 for emission. In the jamming device 200 the jamming signal 209 is provided to the receiving antenna 202 for transmission. It is understood, that a dedicated antenna may also be provided.

Figure 3:
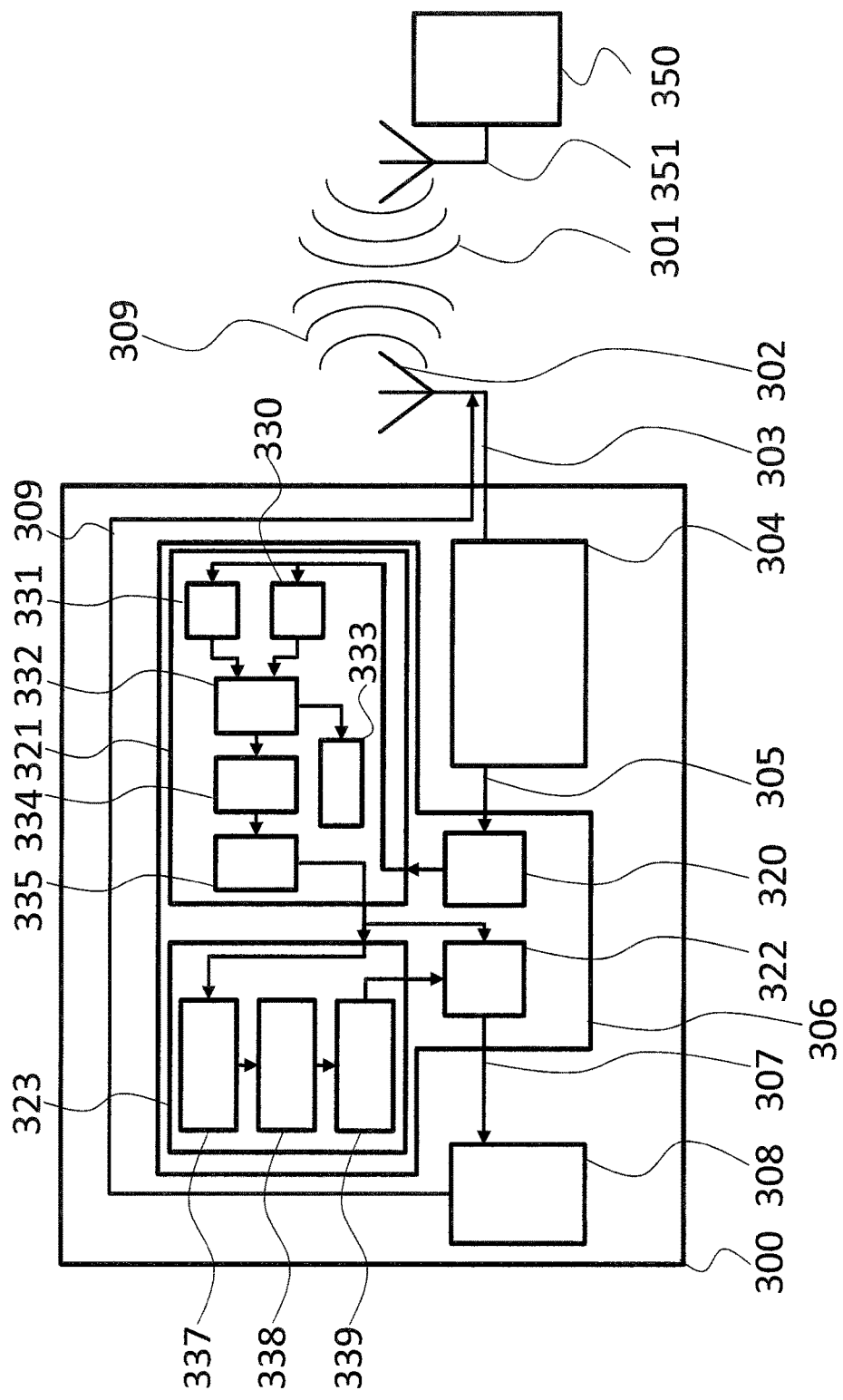
FIG. 3 shows a block diagram of another embodiment of a jamming device according to the present invention.

FIG. 3 shows a block diagram of another embodiment of a jamming device 300. The jamming device 300 is based on the jamming device 200. However, the details of the emission detection unit 304 and the signal jamming unit 308 have been omitted. However, details of the signal type determination unit 321 and the synchronization unit 323 are shown.

The signal type determination unit 321 comprises a modulation analyzer 330 and a timing analyzer 331. The modulation analyzer 330 identifies the modulation type of detected emissions 305 and the timing analyzer 331 identifies timing details, like the start time and the length, of detected emissions 305. The information from the modulation analyzer 330 and the timing analyzer 331 is provided to an emitter identifier 332.

The emitter identifier 332 may e.g. compare the results from the modulation analyzer 330 and the timing analyzer 331 to known parameters of the frequency hopping signal 301 to determine if a detected emission 305 pertains to the frequency hopping signal 301. The emitter identifier 332 may e.g. demodulate the single detected emissions 305 or bursts for further analysis of their content. The emitter identifier 332 may e.g. analyze a preamble or other characteristic sections of the bursts or detected emissions 305 for the occurrence of known or expected content. The single detected emissions 305 may then be sorted out and the detected emissions 305 that correspond to the emitter 350 or the frequency hopping signal 301 may be retained for further processing.

It is understood, that the emitter identifier 332 may perform this analysis without discarding any bursts or detected emissions 305. Instead the emitter identifier 332 may group bursts or detected emissions 305 according to the analysis results. This may e.g. lead to a single group of bursts or detected emissions 305 for every emitter that is in range of the jamming device 300. It is understood, that the specific group may be selected for further processing that pertains to the frequency hopping signal 301.

The emitter identifier 332 may provide its results to a parameter calculator 333. The parameter calculator 333 may e.g. calculate parameters for the exciter(s) of the signal jamming unit 308, e.g. the output frequency for the exciter(s).

The emitter identifier 332 further may provide its results to a channel determination unit 334. The channel determination unit 334 may determine the channel sequence for the frequency hopping signal 301, i.e. the channels that are consecutively used by the frequency hopping signal 301. The results of the emitter identifier 332 may further be provided to a timing sequence determination unit 335. The timing sequence determination unit 335 will determine the timing of the channel hopping in the frequency hopping signal 301.

This results are then provided to the synchronization unit 323. The synchronization unit 323 serves to identify a specific one of the bursts or emissions of the frequency hopping signal 301 in the burst or channel hopping sequence of the frequency hopping signal 301. This may then be used to synchronize the triggering unit 322 with the frequency hopping signal 301 and the channel hop sequence of the frequency hopping signal 301.

To this end the synchronization unit 323 comprises a demodulator 337 coupled on an input side to the channel extraction unit 320 and coupled on an output side to the input side of a correlator 338. The correlator 338 is coupled on the output side to an input side of a threshold detector 339.

The demodulator 337 demodulates the extracted signals 305 according to a predetermined modulation scheme provided by the signal type determination unit 321, i.e. the modulation scheme of the frequency hopping signal 301. The correlator 338 then correlates the demodulated signal with the predetermined template signal and outputs the correlation result to the threshold detector 339. The threshold detector 339 is then configured to output a synchronization trigger signal if the level of the correlation result is higher than a predetermined threshold value.

The predetermined template signal may e.g. be a preamble of the specific burst or emission of the frequency hopping signal 301 that the synchronization unit 323 is looking for to synchronize the jamming device 300.

For sake of clarity in the following description of the method based FIGS. 4 and 5 the reference signs used above in the description of apparatus based FIGS. 1-3 will be maintained.

Figure 4:
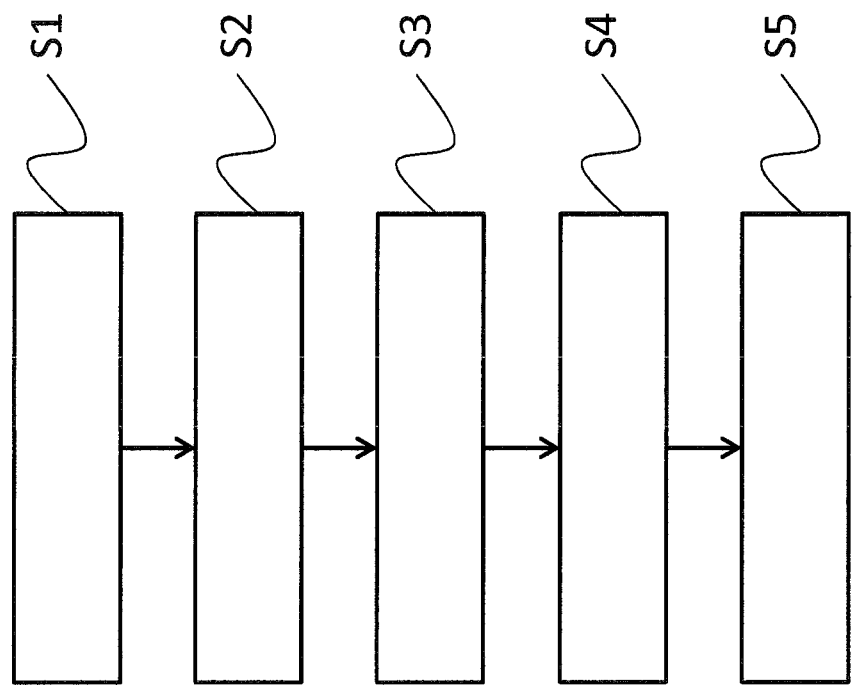
FIG. 4 shows a flow diagram of an embodiment of a jamming method according to the present invention.

FIG. 4 shows a flow diagram of an embodiment of a jamming method for jamming a frequency hopping signal 101, 201, 301.

The jamming method comprises receiving S1 signals in the signal spectrum of the frequency hopping signal 101, 201, 301, detecting S2 emissions 105, 205, 305 in the received signals 103, 203, 303 that possibly pertain to the frequency hopping signal 101, 201, 301. The jamming method further comprises analyzing S3 the detected emissions 105, 205, 305 for determining characteristic properties of the frequency hopping signal 101, 201, 301 in an analysis mode, and outputting S4 corresponding jamming trigger signals 107, 207, 307 in an active jamming mode if detected emissions 105, 205, 305 pertain to the frequency hopping signal 101, 201, 301. For jamming the frequency hopping signal 101, 201, 301 the method comprises jamming S5 in the active jamming mode the relevant emissions 105, 205, 305 with a predictive jamming scheme based on the jamming trigger signals 107, 207, 307 if the jamming trigger signals 107, 207, 307 are available and based on a reactive jamming scheme or a barrage jamming scheme if the jamming trigger signals 107, 207, 307 are not available.

Detecting S2 emissions may comprise converting the received signals 103, 203, 303 into the frequency domain and performing a time-based averaging of the received signals 103, 203, 303 in the frequency domain. Emissions 105, 205, 305 in the received signals 103, 203, 303 may be qualified as possibly pertaining to the frequency hopping signal 101, 201, 301 if respective energy peaks in the averaged received signals 217 in the frequency domain are higher than a predetermined threshold value 219.

Detecting S2 emissions may further comprise calculating the predetermined threshold value 219 based on the averaged received signals 217 in the frequency domain, and especially calculating the predetermined threshold value 219 as the median value or the averaged value of the energy level of all frequency bins of the averaged received signals 217 in the frequency domain.

Detecting S2 emissions may further comprises providing frequency information about detected emissions 105, 205, 305. Analyzing S3 the detected emissions 105, 205, 305 may comprises extracting from the received signals 103, 203, 303 the signals in the frequency ranges of the detected emissions 105, 205, 305 for analyzing the single detected emissions 105, 205, 305.

Analyzing S3 the detected emissions 105, 205, 305 may comprise analyzing if a detected emission corresponds to a predetermined emitter and analyzing the timing sequence and/or the frequency sequence of the detected emissions 105, 205, 305 that correspond to the predetermined emitter.

Outputting S4 corresponding jamming trigger signals 107, 207, 307 may comprise generating the jamming trigger signals 107, 207, 307 based on the timing sequence and/or the frequency sequence of the detected emissions 105, 205, 305 that correspond to the predetermined emitter. Outputting S4 may especially comprise generating a channel extraction trigger signal based on the timing sequence and/or the frequency sequence of the detected emissions 105, 205, 305 that correspond to the predetermined emitter for extracting from the received signals 103, 203, 303 the signals in the frequency ranges of the detected emissions 105, 205, 305.

Analyzing S3 the detected emissions 105, 205, 305 may further comprise providing in the active jamming mode frequency information about the emissions that correspond to the predetermined emitter for jamming S5 in the active mode. Jamming S5 in the active mode may comprise emitting a signal based on the respective frequency information and the jamming trigger signals 107, 207, 307.

Analyzing S3 the detected emissions 105, 205, 305 may further comprise generating an averaging trigger for performing the time-based averaging based on the timing sequence and/or the frequency sequence of the detected emissions 105, 205, 305 that correspond to the predetermined emitter for triggering an averaging cycle.

Analyzing S3 the detected emissions 105, 205, 305 may comprise receiving signal synchronization information and outputting a synchronization trigger signal if an emission of the frequency hopping signal 101, 201, 301 is detected based on the signal synchronization information. The signal synchronization information comprises a predetermined modulation scheme and a predetermined template signal, and analyzing S3 the detected emissions 105, 205, 305 may comprises demodulating the detected emissions 105, 205, 305 based on the predetermined modulation scheme.

Outputting a synchronization trigger signal may comprise correlating the demodulated signal with the predetermined template signal and outputting the synchronization trigger signal if the level of the correlation result is higher than a predetermined threshold value.

The jamming method may further comprise synchronizing to the frequency hopping signal 101, 201, 301 based on the synchronization trigger signal and performing detecting S2 emissions and/or analyzing S3 the detected emissions 105, 205, 305 and/or outputting S4 corresponding jamming trigger signals 107, 207, 307 and/or jamming S5 in the active jamming mode synchronous to the frequency hopping signal 101, 201, 301.

Figure 5:
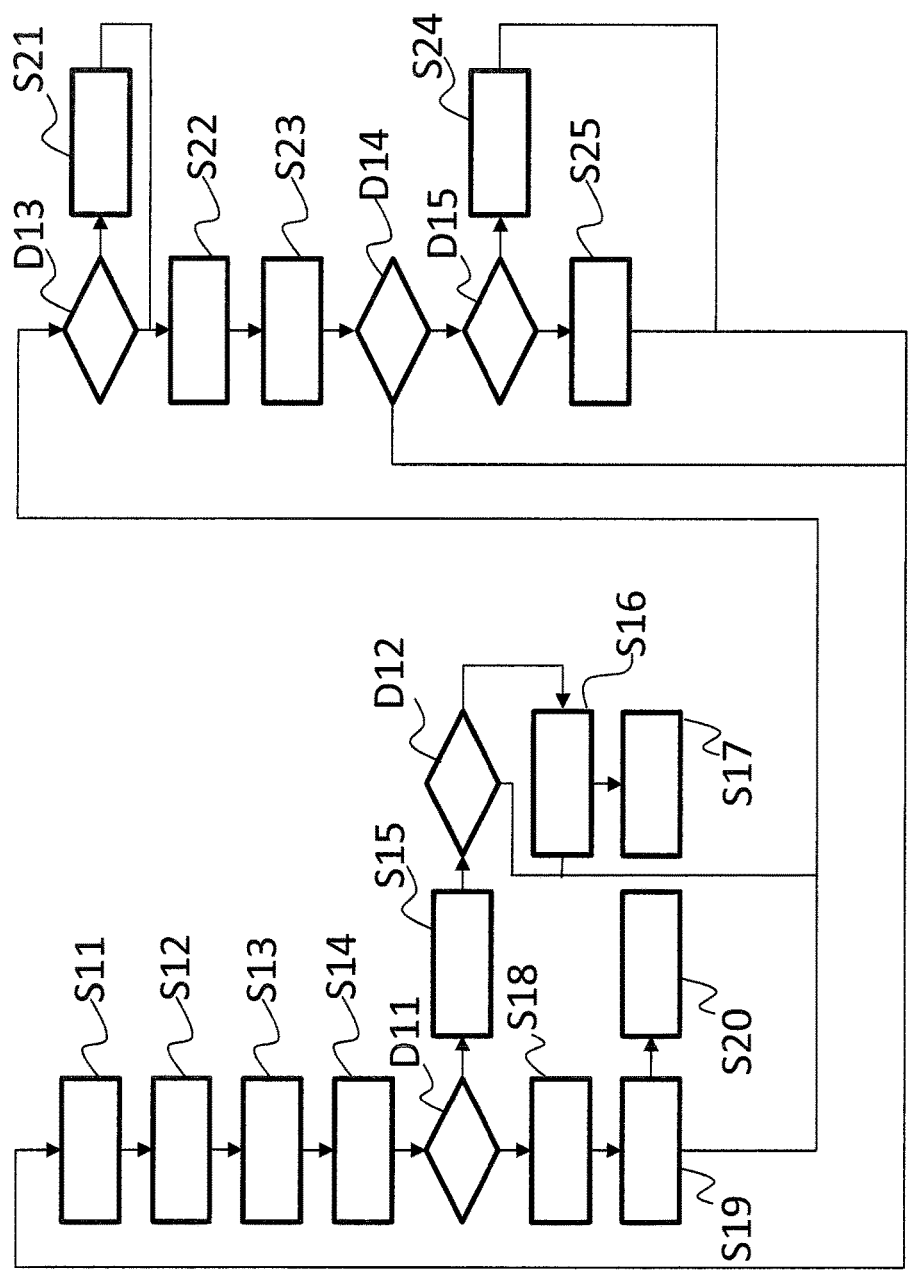
FIG. 5 shows a flow diagram of an embodiment of a jamming method according to the present invention.

FIG. 5 shows a flow diagram of an embodiment of a jamming method for jamming a frequency hopping signal 101, 201, 301.

The method starts at step S11 with a free running detection of possibly relevant emissions 105, 205, 305. This may e.g. be performed with a Fast Fourier Transform or with a poly phase filter bank, e.g. via the emission detection unit 104, 204, 304 and a threshold value detector or comparator.

In step S12 the detected relevant emissions 105, 205, 305 are extracted as narrowband signals from the wideband received signal 103, 203, 303. This may e.g. be performed with the channel extraction unit 220, 320. Narrowband in this context refers to the extracted signals comprising a smaller frequency range or bandwidth than the received signal 103, 203, 303.

In step S13 the modulation type of the single extracted signals, e.g. relevant emissions 105, 205, 305 that each individually or in combination represent a signal burst of the frequency hopping signal 101, 201, 301, are analyzed to determine the modulation scheme. In step S14 the single relevant emissions 105, 205, 305 are assigned to the respective emitters. Assigning in this context refers to determining, which emitter or which type of emitter, e.g. a GSM phone, a Bluetooth device or a WIFI device, is the source of the respective relevant emissions 105, 205, 305.

After identifying the emitter and determining the modulation, it is verified in decision D11 if a respective emitter profile is available in an emitter database. Such a profile may e.g. refer to a GSM emitter, a Bluetooth emitter, e WIFI emitter, a radio control emitter or the like. If the profile is available, in optional step S15 a warning signal may be provided e.g. to a user. In decision D12 it is verified if the emitter profile is complete. If this is not the case, in step S16 the emitter profile may be updated with the information of the modulation scheme or further measurement values that may be determined from the received signals 103, 203, 303. In step S17 the updated profile may be stored in the database. The method then continues with decision D13.

If in decision D11 it is determined that no emitter profile is present in the database for the determined emitter(s), a warning signal may be provided or updated in step S18 with the information that an unknown emitter is present.

In step S19 the emitter profile is then generated from measurement values. The emitter profile may e.g. comprise a timing sequence and/or the frequency sequence of the detected emissions 105, 205, 305. Such a profile may therefore e.g. be determined by a signal analysis unit 106, 206, 306.

In decision D13 it is verified if the effector profile is complete. The effector in this context refers to the jamming signal unit 108, 208, 308 and an emitter (if it is not integrated into the jamming signal unit 108, 208, 308). If the effector profile is not complete, the missing parameters are determined in step S21 based on measurement values, like e.g. a center frequency and the bandwidth of the current burst of the frequency hopping signal 101, 201, 301 that is to be jammed.

If the profile is complete or the missing parameters are provided in step S21, the method continues in step S22 with an analysis of the channel hop sequence or frequency sequence of the frequency hopping signal 101, 201, 301 and the timing sequence of the frequency hopping signal 101, 201, 301. Again, this may e.g. be performed by a signal analysis unit 106, 206, 306.

In step S23 the preamble of the bursts of the frequency hopping signal 101, 201, 301 is identified. Such a preamble may uniquely identify the bursts of the frequency hopping signal 101, 201, 301 by including specific unique details, like e.g. a sender or emitter identifier. The preamble may e.g. be identified by demodulating the burst of the frequency hopping signal 101, 201, 301 and segmenting the demodulated signal. The demodulated signal may also be correlated with known preambles and the best match may be selected.

In decision D14 it is verified if a jamming operation is requested. If not, the method returns to step S11. If however a jamming operation is requested, in decision D15 it is verified if the channel hop sequence or frequency sequence of the frequency hopping signal 101, 201, 301 could be determined. If yes, the prediction or predictive jamming scheme is used to jam the frequency hopping signal 101, 201, 301. If the channel hop sequence or frequency sequence of the frequency hopping signal 101, 201, 301 could not be determined, a reactive or a barrage jamming scheme may be used, depending on which of the jamming schemes is viable.

With the predictive jamming scheme the exciters 225 or signal generators in the signal jamming unit 108, 208, 308 may be configured according to the determined channel hop or frequency sequence based on the detection of a specific burst in the sequence with a correlation, as e.g. performed by the synchronization unit 223, 323. This may be performed at least for one burst or a plurality of bursts if the first try is not successful. If this is not successful, single bursts may be individually analyzed to determine the position of the burst in the channel hop sequence.

After identifying the respective burst in the channel hop sequence, the exciters 225 or signal generators in the signal jamming unit 108, 208, 308 may be continually re-configured according to the determined channel hop sequence or frequency sequence of the frequency hopping signal 101, 201, 301 and the timing sequence of the frequency hopping signal 101, 201, 301. In every cycle of the channel hop sequence of the frequency hopping signal 101, 201, 301 one burst may be reactively jammed and the measured signals may be used to verify if the jamming parameters, like the channel hop sequence or frequency sequence of the frequency hopping signal 101, 201, 301 and the timing sequence of the frequency hopping signal 101, 201, 301 are still valid.

In the reactive jamming mode the exciters 225 or signal generators in the signal jamming unit 108, 208, 308 may be configured according to a detection of a specific burst with a correlation, as e.g. performed by the synchronization unit 223, 323. This may be performed at least for one burst or a plurality of bursts if the first try is not successful. If the preamble correlation is not successful, single bursts may be individually analyzed to determine the required parameters as e.g. the center frequency and bandwidth.

If the timing sequence of the frequency hopping signal 101, 201, 301 could be determined, either the center frequency of the respective burst may be determined and a respective jamming signal 109, 209, 309 may be emitted or a wideband jamming signal 109, 209, 309 may be emitted during the burst. If no timing sequence of the frequency hopping signal 101, 201, 301 could be determined, the jamming signal 109, 209, 309 may be continuously emitted with e.g. three repetitions of the jamming signal 109, 209, 309 during a single burst of the timing sequence of the frequency hopping signal 101, 201, 301 could be determined.

The reactive jamming mode may be cancelled and the analysis mode or phase may be repeated, if the preamble of the bursts of the frequency hopping signal 101, 201, 301 was determined but the correlation is not successfully for a predetermined number of times. The same applies, if the preamble could not be determined but the timing sequence of the frequency hopping signal 101, 201, 301 could be determined and no jamming is possible. If neither the preamble of the bursts of the frequency hopping signal 101, 201, 301 nor the timing sequence of the frequency hopping signal 101, 201, 301 could be determined, the barrage jamming may be performed using a "safe" jamming rate, as shown above e.g. three jamming signal bursts 109, 209, 309 during a single burst of the frequency hopping signal 101, 201, 301.

It is understood, that in the predictive jamming mode as well as the reactive jamming mode, a sporadic or cyclic reevaluation of the results of the analysis mode may be performed.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF REFERENCE SIGNS 100, 200, 300 jamming device
101, 201, 301 frequency hopping signal
102, 202, 301 receiving antenna
103, 203, 303 received signal
104, 204, 304 emission detection unit
105, 205, 305 relevant emissions
106, 206, 306 signal analysis unit
107, 207, 307 jamming trigger signals
108, 208, 308 signal jamming unit
109, 209, 309 jamming signal
215 frequency analysis unit
216 detector 217 averaged received signals
218 threshold calculation unit
219 predetermined threshold value
220, 320 channel extraction unit
221, 321 signal type determination unit
222, 322 triggering unit
223, 323 synchronization unit
225 exciter
226 modulator
227 amplifier
330 modulation analyzer
331 timing analyzer
332 emitter identifier
333 parameter calculator
334 channel determination unit
335 timing sequence determination unit
337 demodulator
338 correlator
339 threshold detector
150, 250, 350 emitter
151, 251, 351 antenna
S1-S5 method steps
S11-S25 method steps
D11-D15 decisions

What is claimed is:

1. A jamming device for jamming a frequency hopping signal, the jamming device comprising:
 at least one receiving antenna configured to receive signals in the signal spectrum of the frequency hopping signal;
 an emission detection unit configured to detect emissions in the received signals that possibly pertain to the frequency hopping signal;
 a signal analysis unit configured to analyze the detected emissions for determining characteristic properties of the frequency hopping signal in an analysis mode and configured to output corresponding jamming trigger signals in an active jamming mode if detected emissions pertain to the frequency hopping signal; and
 a signal jamming unit configured to jam in the active jamming mode the relevant emissions with a predictive jamming scheme based on the jamming trigger signals if the jamming trigger signals are available and based on a reactive jamming scheme or a barrage jamming scheme if the jamming trigger signals are not available,
 wherein the emission detection unit is configured to provide the signal analysis unit with frequency information about detected emissions, and the signal analysis unit comprises a channel extraction unit, the signal analysis unit is configured to extract from the received signals the signals in frequency ranges of the detected emissions for analyzing the single detected emissions,
 the signal analysis unit comprises a signal type determination unit configured to analyze if a detected emission corresponds to a predetermined emitter and analyze one of the timing sequence or frequency sequence of the detected emissions that corresponds to the predetermined emitter, and
 the signal type determination unit is configured to determine a modulation scheme of the detected emissions used by an emitter for the frequency hopping signal and to discard all emissions that comprise another modulation scheme than the frequency hopping signal.

2. The jamming device of claim 1,
 wherein the emission detection unit comprises a frequency analysis unit that is configured to convert the received signal into the frequency domain and to perform a time-based averaging of the received signals in the frequency domain, and
 wherein the emission detection unit comprises a detector configured to qualify emissions in the received signals as possibly pertaining to the frequency hopping signal if respective energy peaks in the averaged received signals in the frequency domain are higher than a predetermined threshold value.

3. The jamming device of claim 2, wherein the emission detection unit further comprises a threshold calculation unit configured to calculate the predetermined threshold value based on the averaged received signals in the frequency domain, or to calculate the predetermined threshold value as the median value or the averaged value of the energy level of all frequency bins of the averaged received signals in the frequency domain.

4. The jamming device of claim 1,
 wherein the signal type determination unit comprises a triggering unit configured to generate the jamming trigger signals based on the timing sequence or frequency sequence, respectively, of the detected emissions that corresponds to the predetermined emitter, and
 wherein the triggering unit is especially configured to generate a channel extraction trigger signal for the channel extraction unit based on the timing sequence or frequency sequence, respectively, of the detected emissions that corresponds to the predetermined emitter.

5. The jamming device of claim 1,
 wherein the signal type determination unit is configured to provide in the active jamming mode frequency information about the emissions that corresponds to the predetermined emitter to the signal jamming unit, and
 wherein the signal jamming unit is configured to emit a signal based on the respective frequency information and the jamming trigger signals.

6. The jamming device of claim 5, wherein the triggering unit is configured to generate an averaging trigger for the frequency analysis unit based on at least one of the timing sequence or frequency sequence of the detected emissions that corresponds to the predetermined emitter for triggering an averaging cycle in the frequency analysis unit.

7. The jamming device of claim 6, wherein the signal analysis unit comprises:
 a synchronization unit configured to receive from the signal type determination unit signal synchronization information and to output a synchronization trigger signal if an emission of the frequency hopping signal is detected based on the signal synchronization information.

8. The jamming device of claim 7, wherein the signal type determination unit is configured to provide in the signal synchronization information a predetermined modulation scheme and a predetermined template signal.

9. The jamming device of claim 8,
 wherein the synchronization unit comprises a demodulator coupled on an input side to the channel extraction unit and coupled on an output side to the input side of a correlator,
 wherein the correlator is coupled on the output side to an input side of a threshold detector,
 wherein the demodulator is configured to demodulate the extracted signals according to the predetermined modulation scheme, wherein the correlator is configured to correlate the demodulated signal with the predetermined template signal and output the correlation result to the threshold detector, and wherein the threshold detector is configured to output the synchronization trigger signal if the level of the correlation result is higher than a predetermined threshold value.

10. The jamming device of claim 7, wherein the signal analysis unit comprises:

a jamming control unit configured to synchronize to the frequency hopping signal based on the synchronization trigger signal and further configured to control synchronous to the frequency hopping signal at least one of:

the emission detection unit;
the signal analysis unit;
the signal jamming unit.

11. A jamming method for jamming a frequency hopping signal, the method comprising:

receiving signals in the signal spectrum of the frequency hopping signal, detecting emissions in the received signals that possibly pertain to the frequency hopping signal, wherein detecting emissions comprises providing frequency information about detected emissions, analyzing the detected emissions for determining characteristic properties of the frequency hopping signal in an analysis mode, outputting corresponding jamming trigger signals in an active jamming mode if detected emissions pertain to the frequency hopping signal, and jamming in the active jamming mode the relevant emissions with a predictive jamming scheme based on the jamming trigger signals if the jamming trigger signals are available and based on a reactive jamming scheme or a barrage jamming scheme if the jamming trigger signals are not available, wherein analyzing the detected emissions comprises extracting from the received signals the signals in the frequency ranges of the detected emissions for analyzing the single detected emissions, analyzing if a detected emission corresponds to a predetermined emitter and analyzing at least one of the timing sequence or the frequency sequence of the detected emissions that corresponds to the predetermined emitter, determining a modulation scheme of the detected emissions used by an emitter for the frequency hopping signal and discarding all emissions that comprise another modulation scheme than the frequency hopping signal.

12. The jamming method of claim 11, wherein detecting emissions comprises:

converting the received signals into the frequency domain and performing a time-based averaging of the received signals in the frequency domain, and qualifying emissions in the received signals as possibly pertaining to the frequency hopping signal if respective energy peaks in the averaged received signals in the frequency domain are higher than a predetermined threshold value.

13. The jamming method of claim 12, wherein detecting emissions further comprises:

calculating the predetermined threshold value based on the averaged received signals in the frequency domain, or calculating the predetermined threshold value as the median value or the averaged value of the energy level of all frequency bins of the averaged received signals in the frequency domain.

14. The jamming method of claim 11, wherein outputting corresponding jamming trigger signals comprises:

generating the jamming trigger signals based on the timing sequence or frequency sequence, respectively, of the detected emissions that corresponds to the predetermined emitter, or generating a channel extraction trigger signal based on the timing sequence or the frequency sequence, respectively, of detected emissions that corresponds to the predetermined emitter for extracting from the received signals the signals in the frequency ranges of the detected emissions.

15. The jamming method of claim 11, wherein analyzing the detected emissions comprises providing in the active jamming mode frequency information about the emissions that correspond to the predetermined emitter for jamming in the active mode, and wherein jamming in the active mode comprises emitting a signal based on the respective frequency information and the jamming trigger signals.

16. The jamming method of claim 14, wherein analyzing the detected emissions further comprises:

generating an averaging trigger for performing the time-based averaging based on the timing sequence or frequency sequence, respectively, of the detected emissions that corresponds to the predetermined emitter for triggering an averaging cycle.

17. The jamming method of claim 16, wherein analyzing the detected emissions comprises:

receiving signal synchronization information and outputting a synchronization trigger signal if an emission of the frequency hopping signal is detected based on the signal synchronization information.

18. The jamming method of claim 17, wherein the signal synchronization information comprises a predetermined modulation scheme and a predetermined template signal, and wherein analyzing the detected emissions comprises demodulating the detected emissions based on the predetermined modulation scheme.

19. The jamming method of claim 18, wherein outputting a synchronization trigger signal comprises:

correlating the demodulated signal with the predetermined template signal and outputting the synchronization trigger signal if the level of the correlation result is higher than a predetermined threshold value.

20. The jamming method of claim 17, further comprising:

synchronizing to the frequency hopping signal based on the synchronization trigger signal and performing synchronous to the frequency hopping signal at least one of:

detecting emissions;
analyzing the detected emissions;
outputting corresponding jamming trigger signals;
jamming in the active jamming mode.

* * * * *